(12) United States Patent
Marco

(10) Patent No.: US 10,591,082 B2
(45) Date of Patent: Mar. 17, 2020

(54) MAGNETICALLY CONTROLLED PRESSURE RELIEF VALVE

(71) Applicant: Stephen Marco, Oklahoma City, OK (US)

(72) Inventor: Stephen Marco, Oklahoma City, OK (US)

( * ) Notice: Subject to any disclaimer, the term of this patent is extended or adjusted under 35 U.S.C. 154(b) by 197 days.

(21) Appl. No.: 15/875,233

(22) Filed: Jan. 19, 2018

(65) Prior Publication Data

US 2018/0142801 A1 May 24, 2018

Related U.S. Application Data

(63) Continuation of application No. 14/735,680, filed on Jun. 10, 2015, now abandoned.

(60) Provisional application No. 62/010,541, filed on Jun. 11, 2014.

(51) Int. Cl.
*F16K 31/08* (2006.01)
*H01F 7/02* (2006.01)

(52) U.S. Cl.
CPC ......... *F16K 31/084* (2013.01); *H01F 7/0252* (2013.01); *Y10T 137/7904* (2015.04)

(58) Field of Classification Search
CPC .............. F16K 31/0644; F16K 31/084; F16K 31/0675; F16K 15/02; H01F 7/0252; Y10T 137/7904
USPC .......................................................... 251/65
See application file for complete search history.

(56) References Cited

U.S. PATENT DOCUMENTS

| | | |
|---|---|---|
| 2,289,574 A | 7/1942 | Carlson |
| 2,646,071 A | 7/1953 | Wagner |
| 2,667,895 A | 2/1954 | Pool et al. |
| 3,495,620 A | 2/1970 | Raimondi et al. |
| 3,626,474 A | 12/1971 | Hammer |
| 3,675,171 A | 7/1972 | Kirk |
| 4,253,489 A | 3/1981 | Schleiter, Sr. |
| 4,273,153 A | 6/1981 | Brown |
| 4,489,754 A | 12/1984 | Seessle et al. |
| 4,574,833 A | 3/1986 | Custer |
| 4,705,070 A | 11/1987 | Eidsmore |
| 4,785,842 A | 11/1988 | Johnson, Jr. |
| 4,792,113 A | 12/1988 | Eidsmore |
| 4,874,012 A | 10/1989 | Velie |

(Continued)

OTHER PUBLICATIONS

Kromschroder; "Magnetic Relief Valve VAN"; Honeywell; (technical information) VAN Edition 5.17; 22 pages (2013).

(Continued)

*Primary Examiner* — Mary E McManmon
*Assistant Examiner* — Nicole Gardner
(74) *Attorney, Agent, or Firm* — Hall Estill Law Firm

(57) ABSTRACT

A relief valve includes a first chamber with an inlet that includes an inlet valve seat and an outlet. A second chamber is spaced apart from the first chamber. A chamber wall is positioned between the first chamber and the second chamber. A closure member is movably positioned within the first chamber and is configured to be closable on the inlet valve seat. A first magnet is coupled to the closure member. The first magnet is movably positioned within the second chamber and is configured to generate a first magnetic field of a first polarity. A second magnet is positioned within the second chamber and is configured to generate a second magnetic field of a second polarity. The first magnetic field and the second magnet field interact to bias the closure member to rest on the inlet valve seat with a set force.

17 Claims, 1 Drawing Sheet

(56) References Cited

U.S. PATENT DOCUMENTS

| | | | |
|---|---|---|---|
| 5,129,414 | A | 7/1992 | Glass et al. |
| 5,437,241 | A | 8/1995 | Rosenberg et al. |
| 6,000,417 | A | 12/1999 | Jacobs |
| 6,092,545 | A | 7/2000 | Bedore et al. |
| 6,732,947 | B2 | 5/2004 | McKenna |
| 6,935,364 | B1 | 8/2005 | Tarazona et al. |
| 7,255,323 | B1 | 8/2007 | Kadhim |
| 7,506,663 | B2 | 3/2009 | Thomas et al. |
| 8,104,591 | B2 | 1/2012 | Barefoot |
| 8,517,334 | B2 | 8/2013 | Shiao et al. |
| 8,714,189 | B2 | 5/2014 | Koeroghlian et al. |
| 8,727,080 | B2 | 5/2014 | Barefoot |
| 2007/0040135 | A1 | 2/2007 | Dyer et al. |
| 2009/0151666 | A1 | 6/2009 | Choi |
| 2009/0205593 | A1 | 8/2009 | Huang |
| 2010/0024901 | A1 | 2/2010 | Sorensen |
| 2013/0319547 | A1 | 12/2013 | Pagel et al. |

OTHER PUBLICATIONS

Shand & Jurs; "94630 Pilot Operated Relief Valve (Magnetic Pilot)"; Rev: 94630-3A; 5 pages; (undated, but prior to Nov. 3, 2014).

Thomas; "High Pressure Proportional Pressure Reducing Valve PPCD04-HTHPPPRV"; 2 pages; (undated, but prior to Nov. 3, 2014).

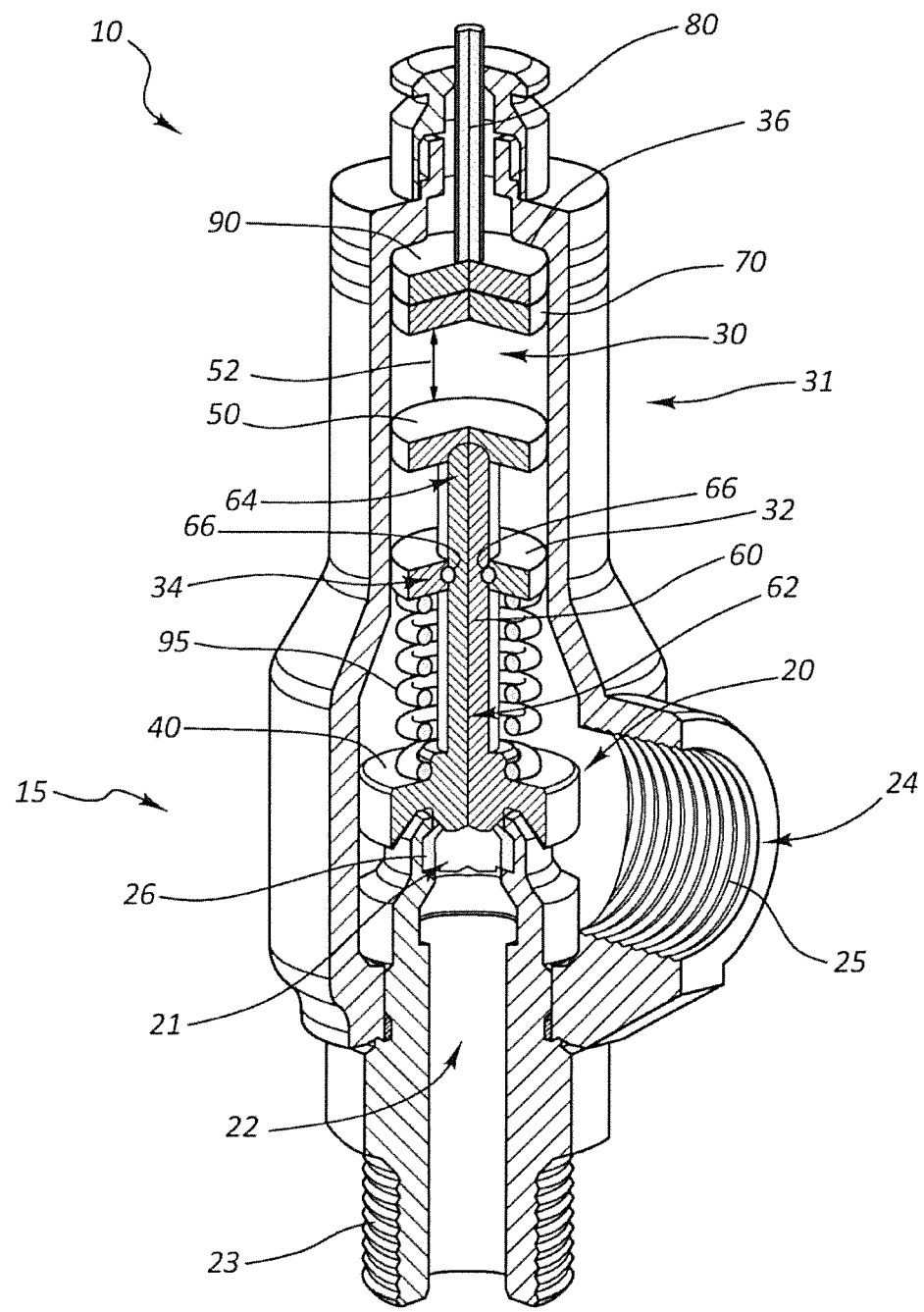

MAGNETICALLY CONTROLLED PRESSURE RELIEF VALVE

CROSS-REFERENCE TO RELATED APPLICATIONS

The present application is a continuation application of U.S. Ser. No. 14/735,680, filed Jun. 10, 2015, which claims benefit under 35 U.S.C. § 119(e) of U.S. Provisional Patent Application Ser. No. 62/010,541, filed Jun. 11, 2014, entitled "MAGNETIC ACTUATING APPARATUS", the entire contents of each of the above-referenced applications are hereby expressly incorporated herein by reference.

STATEMENT REGARDING FEDERALLY SPONSORED RESEARCH OR DEVELOPMENT

Not applicable.

FIELD OF THE INVENTION

The present application relates to magnetically controlled actuation devices, such as a magnetically controlled pressure relief valve in one example.

BACKGROUND OF THE INVENTION

Various types of relief valves are known in the art, including those controlled by springs, magnets, and other biasing mechanisms. The prior art that relied on magnets, however, are deficient. The magnets in these valves were exposed to the flow of fluids. This exposure to the fluid risks decreasing the performance of the valve as any magnetic solids or contaminants adhere to the magnets. Thus, the prior art valves in which the magnets were exposed to fluid flow typically required stringent limits on the types of fluids and any contaminants or solids within the fluids that may be used with those valves. In addition, prior art valves typically required frequent preventive maintenance to minimize any degradation in performance.

Thus, there is a need for a low-cost magnetically controlled actuation device, such as a relief valve, in which the magnets are not exposed to the fluid flow. In addition, there is a need for a magnetically controlled actuation device in which a set force of the device is a linear function, an exponential function, or a combination of a linear function and an exponential function.

SUMMARY OF THE INVENTION

A relief valve includes a body that encompasses and defines a first chamber with an inlet, an inlet valve seat, and an outlet. The body of the relief valve also encompasses and defines a second chamber spaced apart from the first chamber. A chamber wall is positioned between the first chamber and the second chamber. The chamber wall, in part, fluidly isolates the first chamber from the second chamber. A closure member is movably positioned within the first chamber. The closure member is configured to be closable on the inlet valve seat. A first magnet is coupled to the closure member. The first magnet is movably positioned within the second chamber. The first magnet is configured to generate a first magnetic field of a first polarity. A second magnet is positioned within the second chamber and spaced apart from the first magnet. The second magnet is configured to generate a second magnetic field of a second polarity that is opposite the first polarity of the first magnetic field. The first magnetic field and the second magnet field interact to bias the closure member to rest on the inlet valve seat with a set force such that when a pressure in the inlet exceeds a set pressure resulting from the set force the closure member is lifted from the inlet valve seat.

Optionally, embodiments of the relief valve include a stem coupled to the closure member. The stem extends away from the valve seat and through an aperture that extends through the chamber wall and into the second chamber. The first magnet is coupled to the stem.

Optionally, the second magnet maybe be in a fixed position within the second chamber or it may be adjustably positioned within the second chamber via a positioning mechanism and/or at least one spacer positioned between one of the first magnet and the chamber wall and/or the second magnet and the top wall of the second chamber.

Optionally, the relief valve further includes a biasing mechanism positioned between at least one of the first magnet and the second magnet, the second magnet and the top wall, the first magnet and the chamber wall, and the closure member and the chamber wall.

Optionally, a set force of the relief valve is a linear function of a distance between the first magnet and the second magnet, an exponential function of a distance between the first magnet and the second magnet, or a combination of a linear function and an exponential function.

In yet another embodiment, a magnetically controlled actuation device is configured to apply a force in a linear direction. A body defines a chamber and a chamber wall, wherein the chamber is fluidly isolated from an exterior of the chamber. A first magnet is movably positioned within the chamber. The first magnet is configured to generate a first magnetic field of a first polarity. A stem has a first end and a second end. The first magnet is coupled proximate to the second end of the stem. The first end of the stem extends away from the first magnet and through an aperture that extends through the chamber wall to an exterior of the chamber. A second magnet is positioned within the chamber and spaced apart from the first magnet. The second magnet is configured to generate a second magnetic field of a second polarity that is opposite the first polarity. The first magnetic field and the second magnet field interact to bias the stem with a force.

These and other advantages, as well as the invention itself, will become more easily understood in view of the attached drawings and apparent in the details of construction and operation as more fully described and claimed below. Moreover, it should be appreciated that several aspects of the invention can be used with other types of actuation devices, including, but not limited to, relief valves.

BRIEF DESCRIPTION OF THE DRAWINGS

FIG. 1 is a cut-away view of an embodiment of a magnetically controlled actuation device, such as a relief valve.

DETAILED DESCRIPTION OF THE INVENTION

"Pressure" as used herein generally refers to absolute pressure rather than gauge pressure, unless otherwise specified. Pressures measured relative to zero pressure (a vacuum) are absolute pressures. Absolute pressure is used in the perfect gas law. Pressures measured relative to atmospheric pressure are called gauge pressures. Absolute pressure (psia or pounds per square inch absolute) equals the measured gauge pressure (psig) plus atmospheric pressure.

Further, reference typically will be made to a fluid throughout the application. The term fluid includes liquids, gases, and mixtures thereof of various types. The fluid may include solids of various types and sizes entrained within the fluid.

FIG. 1 illustrates a cut-away view of a relief valve 10 that includes a body 15. The body 15 encompasses and defines a first chamber 20 with an inlet 22, an inlet valve seat 26, and an outlet 24. The relief valve 10 is removably affixed to a pressure vessel (not illustrated, but known in the art). The pressure vessel may be a closed vessel, or it is a length of conduit, piping, or other closed system to transport fluids, such as gases and liquids. Any method known in the art can be used to removably affix the relief valve 10 to the pressure vessel. Preferably, a threaded engagement is used, such as the threaded connection 23 at the inlet 22 or the threaded connection 25 at the outlet 24. Nuts, bolts, screws, adhesives, and friction fittings may also be used.

The body 15 of the relief valve 10 also encompasses and defines a second chamber 30 spaced apart from the first chamber 20. A chamber wall 32 is positioned between the first chamber 20 and the second chamber 30. Optionally, the chamber wall 32 is formed integrally with the body 15. Thus, the chamber wall 32, in part, fluidly isolates the first chamber 20 from the second chamber 30.

Preferably, the body 15 and the chamber wall 32 typically is formed of one or more types of commercially available mild steel, stainless steel, carbon steel, and combinations thereof. Optionally and most typically, the body 10 is formed of at least one of non-magnetic, anti-magnetic, and/or non-ferrous material. The material for a particular valve 10 may be selected based upon what the valve 10 will be used for, including which type of fluid will be flowing through valve 10.

A closure member 40 is movably positioned within the first chamber 20. The closure member 40 is configured to be closable on the inlet valve seat 26. As illustrated, the closure member 40 is in the shape of a disk, but it can be of any shape to suit the application and the shape of the valve inlet 26 and the first chamber 20.

A first magnet 50 is coupled to the closure member 40. The first magnet 50 may be permanently or removably coupled to the closure member 40, and the first magnet 50 may be either directly or indirectly coupled to the closure member 40.

As illustrated in FIG. 1, a stem 60 includes a first end 62 and a second end 64. The stem 60 is coupled to the closure member 40 proximate the first end 62 of the stem 60. The second end 64 of the stem 60 extends away from the valve seat 26 and through an aperture 34 that extends through the chamber wall 32 and into the second chamber 30. The first magnet 50 is coupled proximate to the second end 64 of the stem 60.

Optionally, at least one seal 66, such as an O-ring or other type of seal, is positioned at least one of around the stem 60 and within the aperture 34. The seal 64 aids in fluidly isolating the second chamber 30 form the first chamber 20.

The first magnet 50 is movably positioned within the second chamber 30. The first magnet 50 is configured to generate a first magnetic field (not illustrated) of a first polarity.

A second magnet 70 is positioned within the second chamber 30 and spaced apart from the first magnet 50. Optionally, the second magnet 70 maybe be in a fixed position within the second chamber 30 or it may be adjustably positioned within the second chamber 30. For example the second magnet 70 may be directly or indirectly coupled to a positioning mechanism 80. The positioning mechanism is configured to adjustably position the second magnet 70 within the second chamber 30 relatively closer or further from a top wall 36 of the second chamber 30. As illustrated the adjustment mechanism 80 can be a set screw, or it can be another type of mechanism, including gears, levers, ridges, ledges, and the like that permit the positioning mechanism to adjustably position the second magnet 80 within the second chamber 30.

The second magnet 70 is configured to generate a second magnetic field (not illustrated) of a second polarity that is opposite the first polarity of the first magnetic field. The first magnetic field and the second magnet field interact to bias the closure member 40 to rest on the inlet valve seat 26 with a set force such that when a pressure in the inlet 22 exceeds a set pressure resulting from the set force the closure member 40 is lifted from the inlet valve seat 26.

The first magnet 50 and the second magnet 70 may be of any type of magnet, including electro-magnets. Typically, the first magnet 50 and the second magnet 70 are permanent magnets and, optionally, rare-earth magnets.

Optionally, at least one spacer is positioned between one of the first magnet 50 and the chamber wall 32 (not illustrated) and the second magnet 70 and the top wall 36 of the second chamber 30. For example, and as illustrated in FIG. 1, a spacer 90 is positioned between the second magnet 70 and the top wall 36 of the second chamber 30. Increasing or decreasing the number of spacers 90 and/or increasing or decreasing the dimensions of the spacer may adjust a distance 52 between the first magnet 50 and the second magnet 70, which in turn may adjust the interaction of the first magnetic field with the second magnetic field. The spacer 90 may be formed of one or more types of commercially available mild steel, stainless steel, carbon steel, and combinations thereof. Optionally and most typically, the spacer 90 is formed of at least one of non-magnetic, anti-magnetic, and/or non-ferrous material.

Optionally, the relief valve 10 further includes a biasing mechanism 95 positioned between at least one of the first magnet 50 and the second magnet 70, the second magnet 70 and the top wall 36, the first magnet 50 and the chamber wall 32, and the closure member 40 and the chamber wall 32. As illustrated in FIG. 1, the optional biasing mechanism 95 is positioned the closure member 40 and the chamber wall 32. The illustrated biasing mechanism 95 is a spring, although other biasing mechanisms configured to apply a force when either extended or compressed may be used. The biasing mechanism optionally adheres to a linear force-distance relationship, i.e., one defined by Hooke's Law.

Alternatively it may be consider that FIG. 1 conceptually discloses a magnetically controlled actuation device 10 configured to apply a force in a linear direction. A body 15 defines a chamber 30 and a chamber wall 32, wherein the chamber 30 is fluidly isolated from an exterior 31 of the chamber 30. A first magnet 50 is movably positioned within the chamber 30. The first magnet 50 is configured to generate a first magnetic field of a first polarity.

A stem 60 has a first end 62 and a second end 64. The first magnet 50 is coupled proximate to the second end 64 of the stem 60. The first end 62 of the stem 60 extends away from the first magnet 50 and through an aperture 34 that extends through the chamber wall 32 to the exterior 31 of the chamber 30.

A second magnet 70 is positioned within the chamber 30 and spaced apart from the first magnet 50. The second magnet 70 is configured to generate a second magnetic field of a second polarity that is opposite the first polarity. The first magnetic field and the second magnet field interact to bias the stem 60 with the force.

In this alternative conception of FIG. 1, i.e., without the other recited elements, the magnetically controlled actuation device 10 is capable of creating a linear force and movement along an axis of the stem 60. This linear force and movement may be suitable for valves of various types, as well as other applications, such as shock absorbers, weighted scales or scales, triggers of various types, automatic doors and doors, scissors, exercise equipment, door handles, "floating" chairs and beds, break-away chair backs, safety car seats, weight sensors, and so forth.

It will be appreciated that the embodiments disclosed above can be used as separate contained system that may be substituted for more conventional linear actuation devices and control apparatus. For example, body 15 may be considered a sleeve or cartridge that encloses the chamber 30, the first magnet 50, and the second magnet 70 and any optional components. Thus, the body 15 may form an apparatus that can be used to as a replacement component, for example, a traditional relief valve. More specifically, the body 15, chamber 30, the first magnet 50, and the second magnet 70 and any optional components may form a cartridge or sleeve that may be positioned within the body of a traditional relieve valve to replace a mechanical (e.g., spring-actuated) valve components. Thus, another embodiment is a magnetically controlled apparatus configured to replace the functional components, i.e., the biasing mechanism or other force-generating component, of another actuation device, such as a relief valve.

With the components thus illustrated, various advantages of the disclosed embodiments may be better appreciated.

As noted, the first chamber 20 and the second chamber 30 are fluidly isolated. This presents an advantage over prior known magnetically controlled valves and actuators in that the first magnet 50 and the second magnet 70 are not exposed to the fluid and any solids or contaminants within the fluid as it flows through the first chamber 20. This configuration minimizes and, in some instances, eliminates the risk that ferrous solids or contaminants might adhere to either the first magnet 50 or the second magnet 70.

During operation, when the closure member 40 rests on inlet valve seat 26, fluid cannot escape from a pressure vessel through the inlet 22 and out of the inlet valve seat 26 into the chamber 20 and, ultimately, through the outlet 24. The closure member 40 rests on inlet valve seat 26 in the closed position because a user has selected a particularly relief valve 10 with selected dimensions and/or selected first magnet 50 and second magnet 70 of a desired strength of magnetic field. Further, a user may have adjusted the positioning mechanism 80 and/or a number and size of spacers 90 to adjust the distance of the second magnet 70 relative to the first magnet 50 so as to cause the closure member 40 to stay closed on inlet valve seat 26. Further, the user may select the use of a biasing mechanism 95 of selected characteristics (spring constant, for example).

The amount of force—a function of one or more of the foregoing factors—that the interaction of the first magnetic field with the second magnetic field applies against the closure member 40 produces the set pressure.

When the pressure inside the inlet 22 exceeds the set pressure, the relief valve 10 opens. Specifically, the fluid comes through the inlet 22 through the inlet nozzle 21 and applies an upward force to the closure member 40. When the upward force exceeds the down forces acting on the closure member 40, including the set pressure, the closure member 40 is lifted from the inlet valve seat 26 and guided upward. Note that the upward/downward language is used to describe the orientation of preferred embodiment of the valve 10 shown in FIG. 1. The relief valve 10 could be designed so that the closure member 40 moved horizontally rather than vertically, or in another direction.

When the closure member 40 is lifted from the inlet valve seat 26, fluid escapes from the inlet nozzle 21 into the chamber 20 and through the outlet 24.

As discussed above, the position of the first magnet 50 and the first magnetic field relative to the second magnet 70 and the second magnetic field will affect the set force and the dynamic force as the first magnet 50 moves closer to the second magnet 70 after the closure member 40 is lifted. The closer the first magnet 50 is to the second magnet 70, the greater the force generated by the interaction of the first magnetic field and the second magnetic field.

Typically, over short distances, the interaction of two magnetic fields of opposite polarity will have a linear force-distance relationship. Thus, in some embodiments the set force that is a consequence of the interaction between the first magnetic field and the second magnetic field is a linear function of the distance between the first magnet 50 and the second magnet 70. The term linear function, in this instance, means a force that is within ±10 percent of a force as derived from a linear function defined by Hooke's law, i.e., force equals a constant multiplied by the distance.

Of course, it will be appreciated that over greater distances the interaction of two magnetic fields of opposite polarity will typically have an exponential force-distance relationship. In other words, the set force that a consequence of the interaction between the first magnetic field and the second magnetic field is an exponential function of the distance between the first magnet 50 and the second magnet 70. The term exponential function, in this instance, means a force that is more or less than ±10 percent of a force as derived from a linear function defined by Hooke's law, i.e., force equals a constant multiplied by the distance.

Thus, it will be appreciated that by the dimensional design of the valve 10 and a particular strength of the magnetic field that each of the first magnet 50 and the second magnet 70 generates, one may select to have a set force that is a linear function of a distance between the first magnet 50 and the second magnet 70, an exponential function of a distance between the first magnet 50 and the second magnet 70, or a combination of a linear function and an exponential function.

The set force may be further adjusted, as briefly discussed above, by adjusting the relative position of the first magnet 50 to the second magnet 70 when the closure member 40 is seated against the inlet valve seat 26. The positioning mechanism 80 and/or one or more spacers 90, whether individually or in combination, may adjust the relative position of the first magnet 50 and the second magnet 70.

Further, the optional use of a biasing mechanism 95 may provide a linear force distance relationship through a given range that is additive to the force generated by the interaction of the first magnetic field and the second magnetic field. Thus, the biasing mechanism may further optimize the force as a function of distance. In other words, it may affect and, in some cases, optimize, where at a given distance the force is a linear function and where at a given distance the force is an exponential function, or a combination thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed:

1. A relief valve comprising:
    a body that includes:
        a first chamber with an inlet and an outlet, the inlet comprising an inlet valve seat;
        a second chamber spaced apart from the first chamber; and,
        a chamber wall positioned between the first chamber and the second chamber;
    a closure member movably positioned within the first chamber, the closure member being configured to be closable on the inlet valve seat;
    a biasing mechanism positioned between the closure member and the chamber wall;
    a first magnet coupled to the closure member, the first magnet being movably positioned within the second chamber, the first magnet configured to generate a first magnetic field of a first polarity;
    a second magnet positioned within the second chamber and spaced apart from the first magnet, the second magnet configured to generate a second magnetic field of a second polarity that is opposite the first polarity, wherein the first magnetic field and the second magnet field interact to bias the closure member to rest on the inlet valve seat with a set force such that when a pressure in the inlet exceeds a set pressure resulting from the set force the closure member is lifted from the inlet valve seat.

2. The relief valve of claim 1, wherein the second chamber is fluidly isolated from the first chamber.

3. The relief valve of claim 2, further comprising a stem having a first end and a second end, the stem being coupled to the closure member proximate the first end of the stem, the second end of the stem extending away from the valve seat and through an aperture that extends through the chamber wall and into the second chamber.

4. The relief valve of claim 3, further comprising at least one seal positioned at least one of around the stem and within the aperture.

5. The relief valve of claim 3, wherein the first magnet is coupled proximate to the second end of the stem.

6. The relief valve of claim 1, further comprising a positioning mechanism coupled to the second magnet, wherein the positioning mechanism is configured to adjustably position the second magnet within the second chamber.

7. The relief valve of claim 1, further comprising at least one spacer positioned between the second magnet and a top wall of the second chamber.

8. The relief valve of claim 1, wherein at least one of the first chamber, the second chamber, and the chamber wall is formed of a non-magnetic material.

9. The relief valve of claim 1, wherein the set force is a linear function of a distance between the first magnet and the second magnet.

10. A magnetically controlled actuation device configured to apply a force in a linear direction, the actuation device comprising:
    a body that defines a chamber and a chamber wall, wherein the chamber is fluidly isolated from an exterior of the chamber;
    a first magnet movably positioned within the chamber, the first magnet configured to generate a first magnetic field of a first polarity;
    a closure member movably positioned within another chamber, the closure member being configured to be closable on a valve seat of at least one of an inlet and an outlet in the another chamber;
    a stem having a first end and a second end, wherein the first magnet is coupled proximate to the second end of the stem, the first end of the stem extending away from the first magnet and through an aperture that extends through the chamber wall to the exterior of the chamber;
    a biasing mechanism positioned between the chamber wall and the closure member and around the stem;
    a second magnet positioned within the chamber and spaced apart from the first magnet, the second magnet configured to generate a second magnetic field of a second polarity that is opposite the first polarity, wherein the first magnetic field and the second magnet field interact to bias the stem with the force.

11. The magnetically controlled actuation device of claim 10 wherein the chamber wall separates the chamber from the another chamber.

12. The magnetically controlled actuation device of claim 10, wherein the closure member is coupled proximate to the first end of the stem.

13. The magnetically controlled actuation device of claim 10, further comprising at least one seal positioned at least one of around the stem and within the aperture.

14. The magnetically controlled actuation device of claim 10, further comprising a positioning mechanism coupled to the second magnet, wherein the positioning mechanism is configured to adjustably position the second magnet within the chamber.

15. The magnetically controlled actuation device of claim 10, further comprising at least one spacer positioned between the second magnet and a top wall of the chamber.

16. The magnetically controlled actuation device of claim 10, wherein at least one of the chamber and the chamber wall is formed of a non-magnetic material.

17. The magnetically controlled actuation device of claim 10, wherein the force is a linear function of a distance between the first magnet and the second magnet.

* * * * *